H. W. WOODRUFF.
Treating Molten Metal.
No. 10,115.
Patented Oct. 11, 1853.
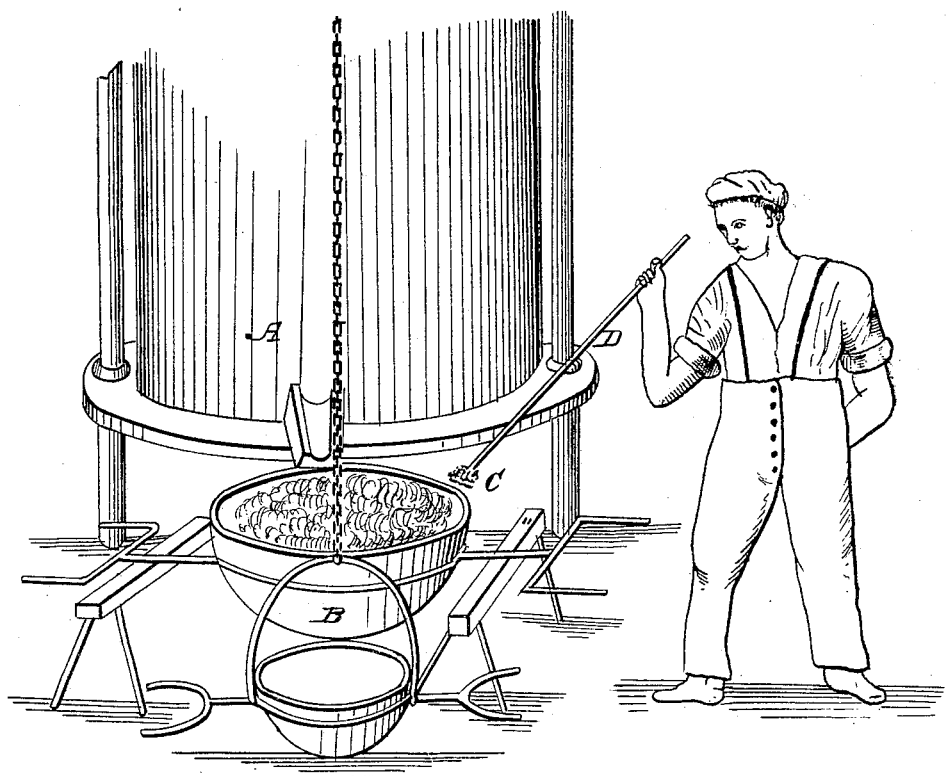

UNITED STATES PATENT OFFICE.

HORACE W. WOODRUFF, OF WATERTOWN, NEW YORK.

IMPROVEMENT IN TREATING METALS WHILE IN THE MOLTEN STATE.

Specification forming part of Letters Patent No. 10,115, dated October 11, 1853.

*To all whom it may concern:*

Be it known that I, HORACE W. WOODRUFF, of Watertown, Jefferson county, New York, have invented a new and useful Improvement in the Treatment of Iron and other Metals in the Molten State, of which the following is a full, clear, and exact description, reference being had to the accompanying drawing, making part of this specification, which drawing represents an external view of the furnace with a pouring-ladle in front containing the molten metal to be treated.

All metals intended for castings, particularly iron, contain foreign substances or impurities, which render the castings made from it porous, rough, and consequently of less strength, and hence it cannot be relied on with confidence, and when used for purposes requiring strength must be applied of proportions greater than would be necessary if the impurities could be extracted.

The object of my invention is to expel foreign substances or impurities, which are mechanically mixed with the metal in the molten state; and to this end the nature of my invention consists in introducing in the mass of metal and at or near the bottom thereof, while in the molten state in the ladle or other vessel and before it is cast, some porous or cellular non-conducting substance containing liquid matter, so that when immersed the heat of the molten metal shall gradually evaporate the liquid matter, so as to cause the escaping vapor to agitate the mass from the bottom, and thus carry the impurities up to the surface, where they can be skimmed off to leave the metal in a pure state.

The mode of procedure which I have practiced with success is as follows: After the iron has been run from the furnace A into the ladle B in front in the usual manner, I take a large potato, C, secured on the end of an iron rod, D, and plunge it into the molten iron, and keep it at the bottom as long as may be desired. The mass of molten iron soon becomes violently agitated, very much in the manner of water boiling at a very high temperature, but more violently, by which all foreign substances are thrown up to the surface, from which they can be skimmed off or otherwise removed. When the agitation ceases to throw up any more impurities, the potato or the remnant thereof is taken out, and the iron is then in a pure state to be cast.

The castings made from iron thus treated I have found to be invariably sound and of much greater strength than when made of iron under any other mode of treatment known to me.

On experiment I have found the same mode of treatment equally applicable to other metals in the molten state with corresponding results.

I prefer to use potatoes in the mode of treatment above specified, for the reason that in its structure the potato is cellular and contains liquid matter in the cells, and as it is a bad conductor of caloric when immersed in the molten metal the evaporation is sufficient to produce the required agitation, and yet so gradual as to avoid all danger; for if the amount of liquid matter required was at once exposed to the molten metal or contained in a good conductor, either an explosion would be the result or the evaporation would be so violent as to throw the molten metal out of the ladle or other vessel. I do not therefore wish to be understood as limiting myself to the use of potatoes in the above mode of treatment, as other substances, natural or artificial, possessing like properties, may be substituted therefor.

What I claim as my invention, and desire to secure by Letters Patent, is—

Treating metals while in the molten state to expel impurities therefrom by immersing therein some porous or cellular non-conducting substance or substances containing liquid matter, substantially as specified.

H. W. WOODRUFF.

Witnesses:
L. G. HOYT,
J. BEALLS.